(12) United States Patent
Tsu et al.

(10) Patent No.: US 7,788,439 B1
(45) Date of Patent: *Aug. 31, 2010

(54) ASYMMETRICAL BUS FOR BUS LINK WIDTH OPTIMIZATION OF A GRAPHICS SYSTEM

(75) Inventors: William P. Tsu, San Jose, CA (US); Colyn S. Case, Hyde Park, VT (US)

(73) Assignee: NVIDIA Corporation, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/252,525

(22) Filed: Oct. 16, 2008

Related U.S. Application Data

(63) Continuation of application No. 11/613,150, filed on Dec. 19, 2006, now Pat. No. 7,469,311, which is a continuation-in-part of application No. 11/229,208, filed on Sep. 16, 2005, now Pat. No. 7,426,597, which is a continuation-in-part of application No. 10/431,994, filed on May 7, 2003, now Pat. No. 7,136,953.

(51) Int. Cl.
*G06F 13/40* (2006.01)
(52) U.S. Cl. .................. 710/307; 710/29
(58) Field of Classification Search .............. 710/29, 710/52, 116–117, 123–124, 306–307, 311
See application file for complete search history.

(56) References Cited

U.S. PATENT DOCUMENTS

| | | | |
|---|---|---|---|
| 5,951,664 A | 9/1999 | Lambrecht et al. | |
| 6,035,408 A | 3/2000 | Huang | |
| 6,079,024 A | 6/2000 | Hadjimohammadi et al. | |
| 6,526,469 B1 | 2/2003 | Drehmel et al. | |
| 6,795,877 B2 | 9/2004 | Glenn | |
| 6,975,601 B2 | 12/2005 | Connors | |
| 7,136,953 B1 | 11/2006 | Bisson et al. | |
| 7,137,018 B2 | 11/2006 | Gutman et al. | |
| 7,188,263 B1 | 3/2007 | Rubinstein et al. | |
| 7,197,591 B2 | 3/2007 | Kwa et al. | |
| 7,254,647 B2 | 8/2007 | Mann | |
| 7,370,132 B1 | 5/2008 | Huang et al. | |
| 7,426,597 B1 | 9/2008 | Tsu et al. | |
| 2002/0054705 A1 | 5/2002 | McCormick et al. | |
| 2004/0088469 A1 | 5/2004 | Levy | |
| 2004/0210687 A1 | 10/2004 | Mann | |

FOREIGN PATENT DOCUMENTS

EP 1146429 A1 10/2001

OTHER PUBLICATIONS

Gerald Holzhammer., Intel, Developer Update Magazine, "Creating a Third Generation I/O Bus," Sep. 2001, pp. 1-5, Copyright © Intel Corporation 2001.

(Continued)

*Primary Examiner*—Clifford H Knoll
(74) *Attorney, Agent, or Firm*—Cooley LLP

(57) ABSTRACT

A bus interface permits an upstream bandwidth and a downstream bandwidth to be separately selected. In one implementation a link control module forms a bidirectional link with another bus interface by separately configuring link widths of an upstream unidirectional sub-link and a downstream unidirectional sub-link.

18 Claims, 8 Drawing Sheets

OTHER PUBLICATIONS

Seh Kwa and Debra T. Cohen—Intel Corporation, "PCI Express, Architecture Power Management," Nov. 8, 2002, pp. 1-14, Copyright © Intel Corporation 2002.

PCI Express, "Base Specification," Revision 1.0a, Apr. 15, 2003, pp. 1-426, Copyright © 2002, 2003 PCI-SIG.

Ajy V. Bhatt (Technology and Research Labs, Intel Corporation), "Creating a Third Generation I/O Interconnect," pp. 1-8. Copyright © 2002.

ASYMMETRICAL BUS FOR BUS LINK WIDTH OPTIMIZATION OF A GRAPHICS SYSTEM

CROSS REFERENCE TO RELATED APPLICATIONS

This is a continuation application of U.S. application Ser. No. 11/613,150, filed Dec. 19, 2006 now U.S. Pat. No. 7,469,311, which application is a continuation-in-part of U.S. application Ser. No. 11/229,208 filed Sep. 16, 2005, now U.S. Pat. No. 7,426,597 B1, which is a continuation-in-part of U.S. application Ser. No. 10/431,994 filed May 7, 2003, now U.S. Pat. No. 7,136,953 B1. These applications are hereby incorporated herein by reference.

FIELD OF THE INVENTION

The present invention is generally related towards high-speed buses having a plurality of data lanes. More particularly, the present invention is directed towards systems in which a high-speed bus having a plurality of data lanes may experience large differences in upstream and downstream traffic.

BACKGROUND OF THE INVENTION

FIG. 1 illustrates two components 105 and 110 which communicate via a Peripheral Component Interface Express (PCIe) bus 115. Each component 105 and 110 includes a bus interface 120. Bus interface 120 includes a physical layer 125, such as drivers, transmitters, receivers, input buffers and other circuits to support the PCIe bus 115. PCIe is a packet-based bus protocol. Data packets are formed in the transaction layer 135 and the data link layer 130. The operation of the physical layer 125, data link layer 130, and transaction layer 135 are described in section 1.5 of the PCI Express Base Specification Revision 1.1 (March 2005) published by PCI-SIG, the contents of which are hereby incorporated by reference. A higher data rate (second generation) version of PCIe having twice the data rate of first generation PCIe is described in the draft standard PCI Express 2.0 Base Specification.

The PCIe standard specifies that a PCIe link between components must have at least one lane 140, where each lane includes a set of differential pairs having one pair for transmission (Tx) and another pair for reception (Rx). That is, each lane has dual simplex connections in that each lane has one simplex connection to transmit data to the other side of the link and one simplex connection to receive data from the other side of the link.

A PCIe bus interface 120 may include more than one transmitter/receiver pair. The PCIe standard allows for two or more lanes 140 to be aggregated to increase the bandwidth. A link training and status state machine (LTSSM) configures a set of data lanes as a link. A link between two components that aggregates a total of N lanes is described as a "by-N" link. A first generation of PCIe ("gen1") by-N link has a bandwidth of 2.5×N Gbps in both the upstream and downstream directions. The second generation of PCIe ("gen2") has a ×N link with twice the bandwidth, or 5×N Gbps in both upstream and downstream directions.

As illustrated in FIG. 2, a conventional ×N link between two components can also be pictured as being equivalent to two unidirectional data links 210 and 220 between the components to send and receive packets in two different directions. That is, a PCIe×N link has N lanes, which corresponds to a total of N simplex connections in one direction and N simplex directions in the other direction. PCIe permits ×1, ×2, ×4, ×8, ×12, ×16, and ×32 lane widths. As an illustrative example, in first generation PCIe, a single lane has 2.5 Gigabits/second/Lane/direction of raw bandwidth such that a ×8 link has 20 Gigabits/second of raw bandwidth in each direction.

One problem associated with conventional PCIe is that traffic between two components is variable. For example, the average traffic load may vary over time. Since a PCIe bus consumes a significant amount of power which increases with the number of active data lanes, the bus size is often a compromise between power and performance. As described in U.S. patent Ser. Nos. 10/431,994 and 11/229,208 by the assignee of the present invention, one solution to variable traffic is to adaptively vary the number of data lanes up or down depending upon such parameters as whether a power-saving mode is used or whether a high-performance mode is used. Data lanes that are unused may be placed in a low power consumption state, thereby reducing bus power consumption. The contents of U.S. patent Ser. Nos. 10/431,994 and 11/229,208 are hereby incorporated by reference.

However, the bus traffic between two components may also be highly asymmetric during certain time intervals. For example, if one component 105 utilizes a PCIe bus to send a command requesting large amounts of data from the other component 110, there is an inherent asymmetry in traffic between the upstream command requests and the downstream flow of large amounts of data. Large asymmetries in bus traffic make it difficult to simultaneously optimize power consumption and performance. In particular, in a system in which there are large time-varying asymmetries in traffic the PCIe lane width may have to be kept large enough to support the worst case peak bursts of traffic in one direction even though traffic in another direction may be light over extended periods of time.

In light of the above-described problems the apparatus, system, and method of the present invention was developed.

SUMMARY OF THE INVENTION

A bus interface supports an asymmetrical bus bandwidth in which an upstream bandwidth and a downstream bandwidth are independently selected. In one implementation a link width of a unidirectional sub-link in the upstream direction is selected independently from a unidirectional sub-link in the downstream direction.

In one embodiment the bus interface includes a set of receivers and transmitters. A link control module forms a bidirectional link with the other bus interface by configuring the receivers as part of a unidirectional sub-link in a downstream direction and configuring the transmitters as part of a unidirectional sub-link in an upstream direction. An asymmetry controller regulates the upstream bandwidth and the downstream bandwidth in response to a control signal.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
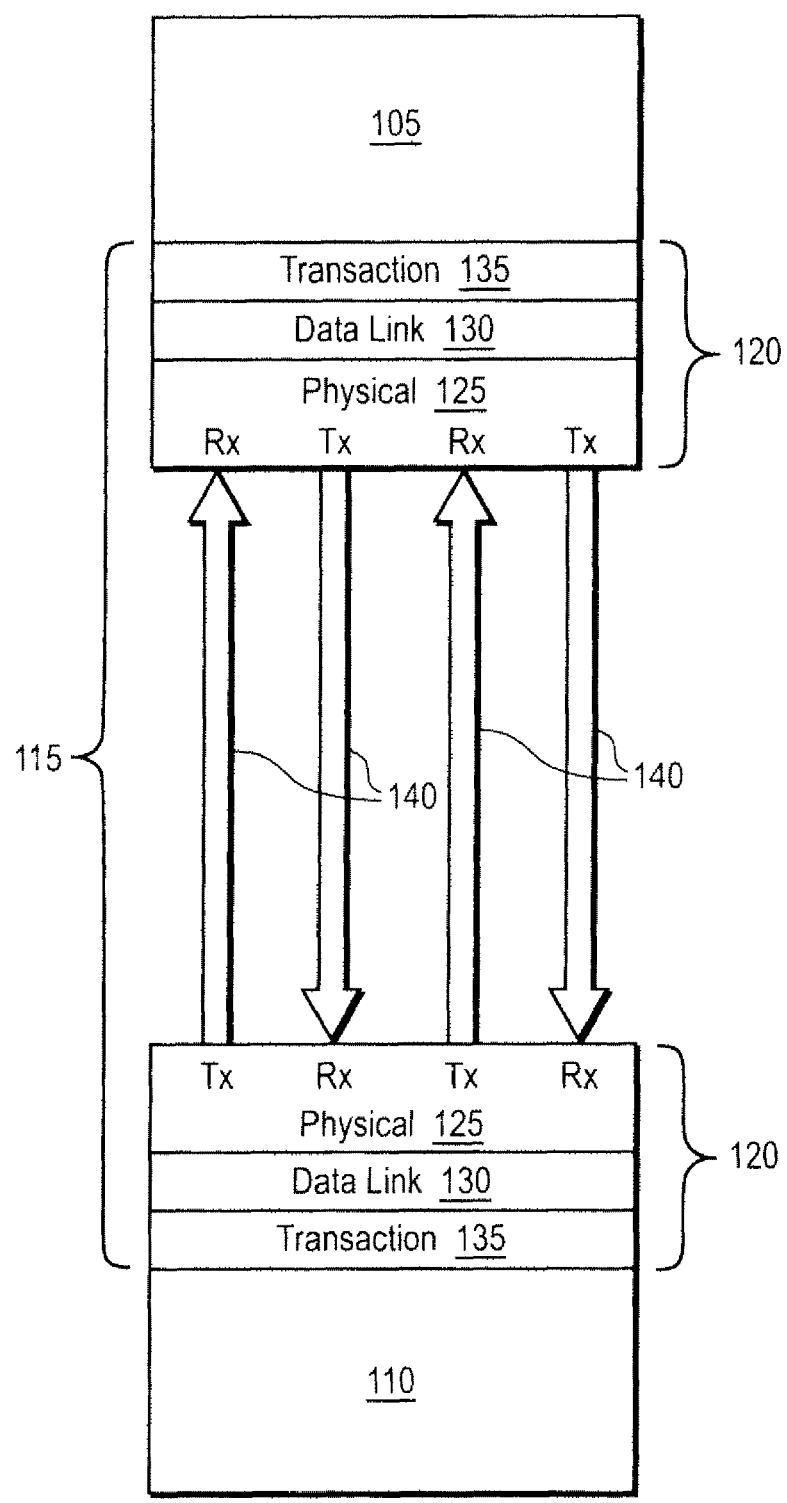
FIG. 1 illustrates a Peripheral Component Interface Express bus between two components in accordance with the prior art.
Figure 2:
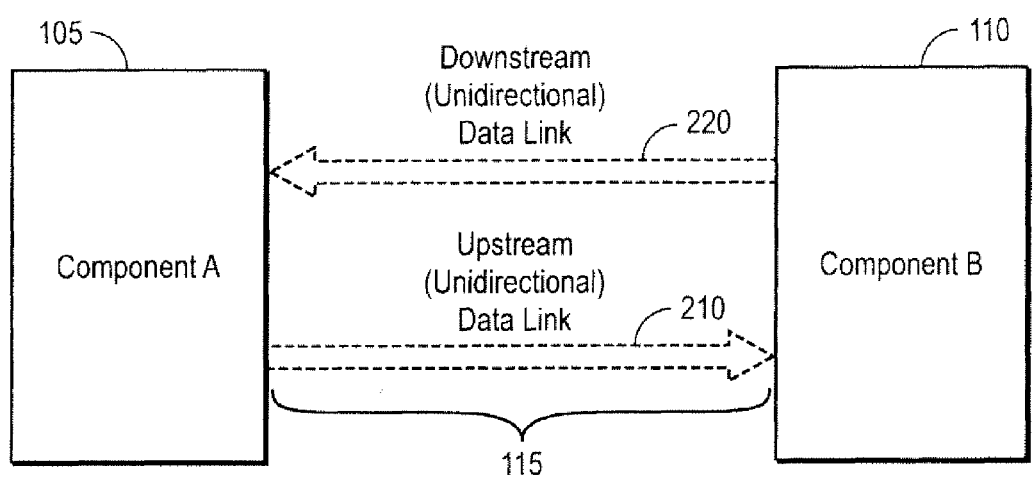
FIG. 2 illustrates a data link between the two components of FIG. 1.
Figure 3:
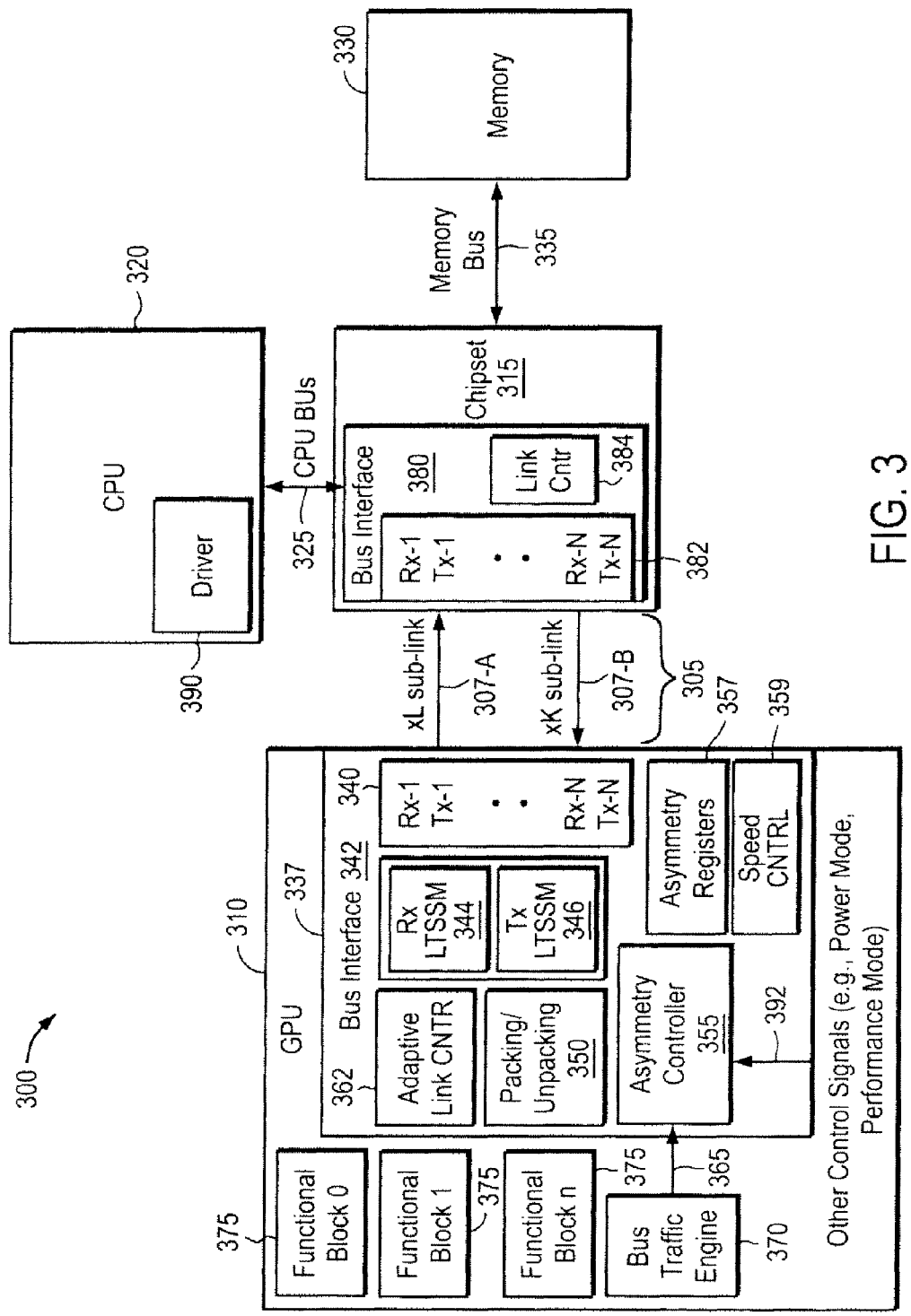
FIG. 3 is a block diagram of a system supporting asymmetrical bus bandwidth in accordance with one embodiment of the present invention.

FIG. 3 illustrates a system 300 that includes a bus 305 between two integrated circuit components, such as a graphics processing unit (GPU) 310 and a chipset 315. System 300 may also include a CPU 320 coupled to chipset 315 by a CPU bus 325. A system memory 330 may be coupled to chipset 315 by a memory bus 335.

Bus 305 includes two unidirectional sub-links 307-A and 307-B. That is, bus 305 establishes a bidirectional link that has a one-way link 307-A in a first direction and a one-way link 307-B in another direction. Unidirectional sub-link 307-A is used by GPU 310 to transmit information to chipset 315. Unidirectional sub-link 307-B is used by GPU 310 to receive information from chipset 315. In accordance with one convention, traffic headed away from bus interface 337 of GPU 310 to chipset 315 is directed "upstream" whereas traffic headed from chipset 315 towards bus interface 337 of GPU 310 is directed "downstream." Unidirectional sub-link 307-A is thus a one-way "upstream" link whereas unidirectional sub-link 307-B is a one-way "downstream" link. In a Peripheral Component Interface Express (PCIe) implementation each unidirectional sub-link 307-A and 307-B comprises a set of aggregated simplex connections for transmitting bus traffic in an upstream or downstream direction.

In one embodiment of the present invention the bandwidth of each sub-link 307-A and 307-B may be independently selected. Consequently, in a normal (symmetric) mode sub-link 307-A and 307-B each have the same bandwidth. However, in an asymmetric mode sub-link 307-A and 307-B each have a different bandwidth. As described below in more detail, the bandwidth of each sub-link 307-A and 307-B may be selected by choosing the number of simplex connections aggregated into each sub-link and/or selecting a speed setting of each sub-link 307-A and 307-B. Note that in a PCIe bus implementation that a "lane" has one simplex connection to transmit data to the other side of a link and one simplex connection to receive data from the other side of the link such that a set of PCIe lanes can be decomposed into two unidirectional sub-links. However, in a conventional PCIe bus, a bidirectional link is formed by negotiating a number of lanes having a set speed. Since each lane includes simplex connections in both directions, a conventional PCIe bus always has the same upstream and downstream bandwidth.

The power required by each sub-link 307-A and 307-B will depend upon its bandwidth. That is, the power consumption of each sub-link 307-A and 307-B will depend upon the number of simplex connections required to be kept in an active state having a high power consumption. The power consumption of a simplex connection will also depend on its speed. Thus, the power consumption of each sub-link 307-A and 307-B will depend upon both its link width and its speed.

In the context of a graphics system there may be intervals of time when bus 305 is used by GPU 310 to issue commands to fetch large amounts of data from memory 330. During those time intervals the bandwidth required to support traffic on unidirectional sub-link 307-A will be comparatively low, since most of the traffic is composed of read commands that have low bandwidth requirements. However the data that is returned via unidirectional sub-link 307-B will require a substantial bandwidth. Since the power consumption of bus 305 depends on the bandwidth supported in both sub-links 307-A and 307-B, the asymmetric mode permits a reduction in bus power consumption during intervals of time when the bus traffic is highly asymmetric.

GPU 310 includes bus interface 337. In a PCIe implementation, bus interface 337 includes a set of transmitters and receivers 340 to support a set of simplex connections. For example, a bus interface 337 capable of supporting ×16 PCIe lanes in the normal mode would have sixteen receivers (Rx) and sixteen transmitters (Tx). Bus interface 337 includes a packing and unpacking module 350 to perform some or all of the transaction layer and data link layer functions required to send data packets over an aggregated set of simplex connections.

A link control module 342 configures sub-links 307-A and 307-B for bus interface 337. As one example, link control module 342 may include a link training and status state machine (LTSSM) to negotiate and configure a first set of simplex connections aggregated to form sub-link 307-A and a second set of simplex connections aggregated to form sub-link 307-B. A conventional PCIe LTSSM configures a set of data lanes having the same speed and same number of simplex connections in each sub-link 307-A and 307-B. In accordance with one embodiment of the present invention, the asymmetric mode is supported by logically partitioning link control module 342 into a receiver LTSSM 344 and a transmitter LTSSM 346 to separately negotiate and configure sub-links 307-A and 307-B, This permits bus interface 337 to separately set the number of simplex connections and speed of each sub-link 307-A and 307-B in the asymmetric mode. In the normal (symmetric) mode a conventional PCIe LTSSM (not shown) may be used to negotiate data lanes such that sub-links 307-A and 307-B have the same bandwidth. In one embodiment, the symmetric mode is a default mode of operation.

Bus interface 337 includes an asymmetry controller 355 to determine bandwidth adjustments to sub-links 307-A and 307-B. In a PCIe implementation bandwidth may be selected by adjusting the number of aggregated simplex connections in each sub-link 307-A and 307-B. For example, if there is a whole positive number N of receivers and transmitters, asymmetry controller 355 may select a total number L of simplex connections be aggregated for sub-link 307-A (a "by L" sub-link) and a number K of simplex connections be aggregated for sub-link 307-B (a "by K" sub-link). Additionally, if bus interface 342 supports different bus speeds, such as gen1 and gen2 PCIe bus speeds, asymmetry controller 355 may separately set the speed of each sub-link 307-A and 307-B, Asymmetry controller 355 may include support modules, such as asymmetry register 357 and a speed controller 359.

in one embodiment asymmetry controller 355 determines adjustments to upstream and downstream bandwidth by monitoring traffic patterns via a traffic signal 365 from a bus traffic engine 370. Bus traffic engine 370 monitors functional blocks 375 that require access to bus 305 and estimates traffic patterns. As one example, bus traffic engine 370 may monitor functional blocks 375 to identify individual events likely to generate bursts of traffic, As an illustrative example an individual functional block 375 issues a command to fetch data from memory. For the case of a texture fetch, a read command may fetch a large chunk of data, such as two megabytes of data. That is, a single read command can result in the return of a large chunk of data fetched from memory 330.

Additionally, in one embodiment bus interface 337 also takes into consideration a power mode or a performance mode. For example, driver 390 may generate a signal 392 indicative of power mode or a performance mode. Asymmetry controller 392 may, for example, utilize signal 392 as one condition to determine whether to utilize the asymmetric mode. For example, the asymmetric mode may be enabled by signal 392 when system 300 is in a low-power mode. Additionally, the asymmetric mode may be enabled or disabled by signal 392 depending upon other modes of system 300, such as a performance mode.

In one embodiment, an adaptive link controller 362 is provided to adapt the link width of sub-link 307-A and 307-B in accordance with bandwidth requirements of bus 305. In one embodiment, asymmetry controller 355 provides information to adaptive link controller 362 indicative of the asymmetry in bandwidth requirements and then adaptive link controller 362 triggers link control module 342 to adapt sub-links 307-A and 307-B. Adaptive link controller 362 may, For example, trigger link adaptation for both the symmetric mode and the asymmetric mode. However, more generally it will be understood that the function of asymmetry controller 355 and adaptive link controller 362 may be combined into one functional block.

Chipset 315 includes a bus interface 380 that is compatible with bus interface 337. For example, bus interface 380 preferably includes a set of transmitters and receivers 382 at least equal in number to those in bus interface 337. A link controller 384 in bus interface 380 supports the asymmetric mode and may, for example, be designed to support separate negotiation of speed and link width for sub-link 307-A and 307-B.

A driver 390 running on CPU 320 may be used to provide graphical commands issued to GPU 310 in accordance with conventional practice. Additionally driver 390 may also be used to set up bus interface 337 during a configuration process, such as by writing information into asymmetry registers 357 to support asymmetry controller 355. Additionally, as previously described driver 390 may also trigger a low-power mode or select a performance mode.

Figure 4:
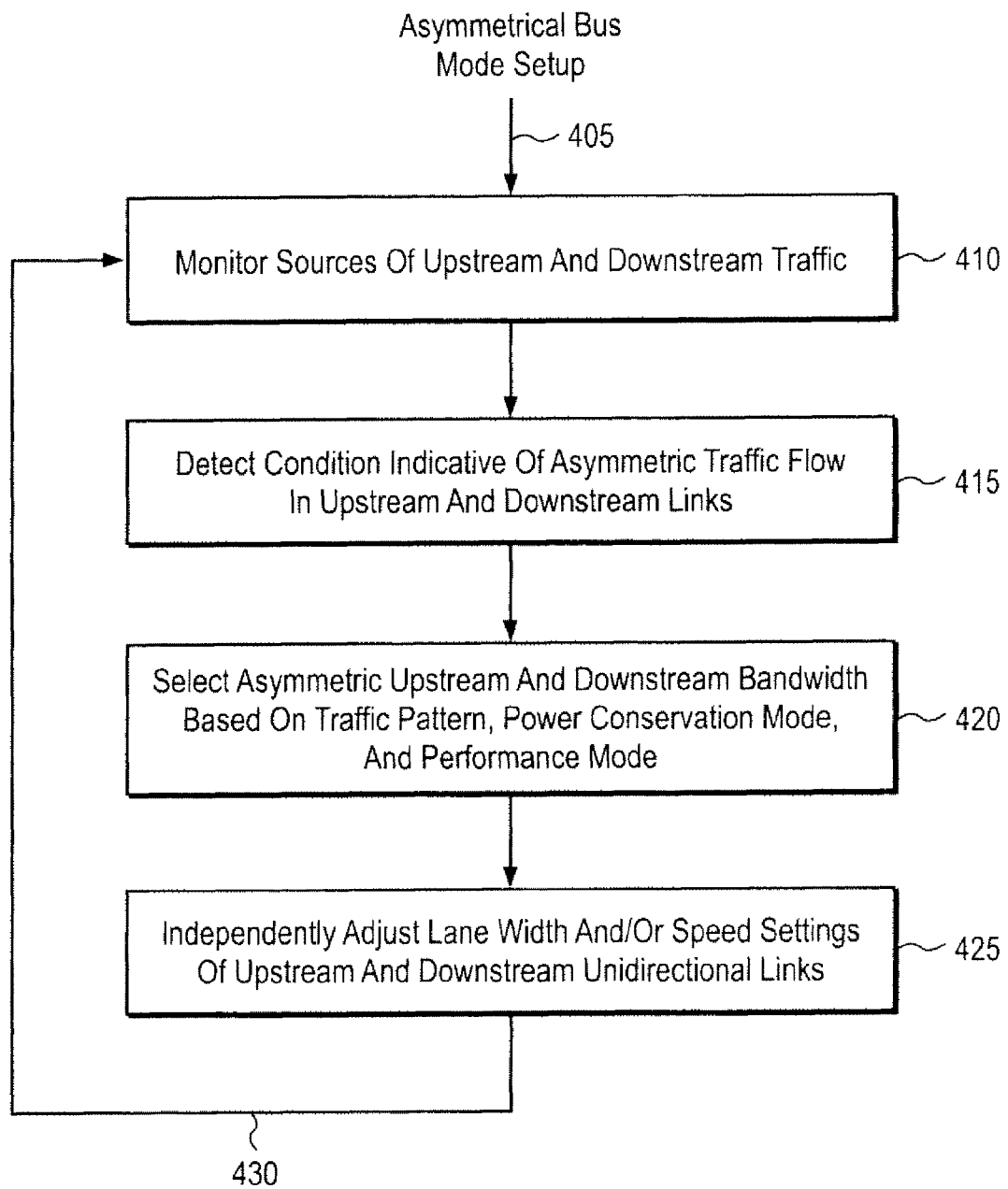
FIG. 4 is flowchart of a method of providing asymmetric bandwidth in accordance with one embodiment of the present invention.

FIG. 4 is a flowchart illustrating a method of operation in accordance with one embodiment of the present invention. At some initial time, a setup step is performed 405 to configure the bus into the asymmetrical mode. For example, a driver may send a signal that a low power mode requiring power conservation is required. The bus interface then monitors 410 functional blocks that are sources of upstream and downstream traffic. The bus interface then detects 415 a condition indicative of asymmetric bandwidth requirements on upstream and downstream sub-links. The bus interface then selects 420 asymmetric upstream and downstream bandwidths. The selection may be based on traffic considerations alone but more generally may take into consideration other criteria, such as a power conservation mode or a performance mode. The bus interface then independently adjusts 425 the link width and/or the speed setting for the upstream and downstream unidirectional links. As indicated by arrow 430, this process can be performed continuously as part of a feedback cycle.

It will be understood that for a particular implementation that rules may be programmed to implement a power-saving strategy for renegotiating link widths of sub-links 307-A and 307-N. For example, the rules may take into consideration a time to complete a renegotiation versus the likely duration of a traffic pattern; potential power savings of a renegotiation; and any other performance tradeoffs associated with performing frequent renegotiations. The renegotiation of link widths and speeds is preferably performed using a high-speed handshaking procedure that renegotiates new link widths and speeds comparatively fast, e.g., a renegotiation time of about one microsecond or less. Note that in one implementation the asymmetric mode is entered only if it is likely that asymmetric, traffic will persist long enough that the asymmetric mode will significantly reduce power consumption. That is, in step 415 the detection of a condition indicative of an asymmetric traffic flow is in regards to asymmetric traffic flows likely to last for some minimum time. Other conditions can also be imposed such as threshold criteria, such as a minimum ratio of asymmetry or minimum power savings.

Figure 5:
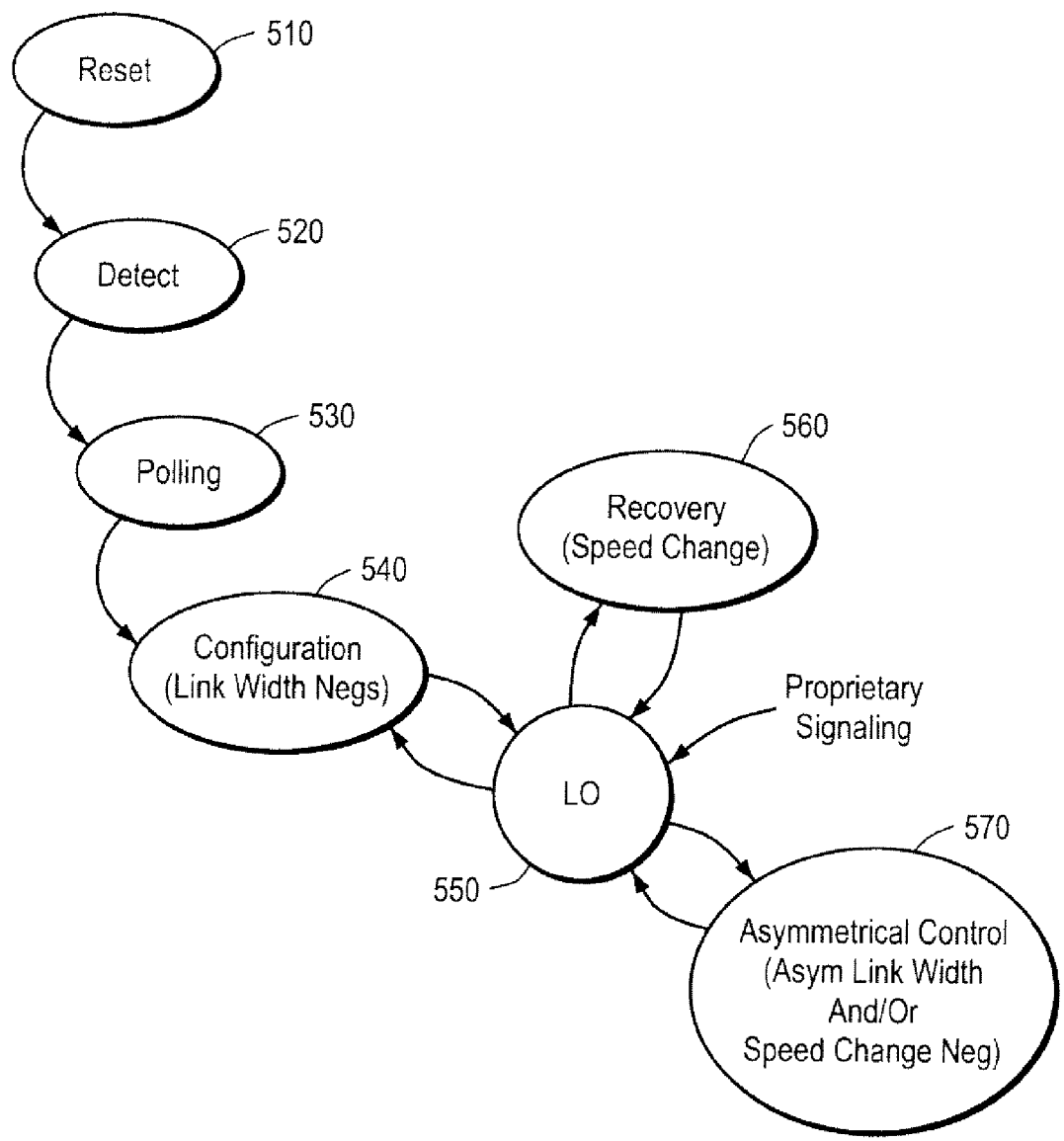
FIG. 5 is a state diagram in accordance with one embodiment of the present invention.

FIG. 5 is a state diagram for a LTSSM of link control module 342 in accordance with one embodiment of the present invention. Reset state 510, detect state 520, polling state 530, configuration state 540, L0 state 550, and recovery state 560 are conventional PCIe states describe in section 4.2 of the PCIe Express Base Specification, the contents of which are hereby incorporated by reference. The reset state 510 returns the state machine to an initial condition, and includes cold, warm, and hot reset. The detect state 520 detects whether a far end termination is present. The polling state 530 transmits training sets and responds to training sets. The configuration state 540 configures links through a width and lane negotiation sequence. The recovery state 560 provides a number of functions, such as allowing a configured link to reestablish various parameters, such as symbol lock, bit lock, or lane-to-lane deskew. The recovery state 560 is also used to enter other states. The L0 state 550 is the normal operation state. In the present invention, an additional asymmetrical control state 570 is added as an additional state in which each sub-link may have its link width and/or speed independently negotiated and configured. A signaling technique may be used to trigger entry into asymmetrical control state 570.

An exemplary implementation of the dynamic formation of an asymmetrical bus link width will now be described. At some initial time, the downstream device detects that it can trim its upstream facing uni-directional link from 16 lanes to 4 lanes. The downstream device then issues a memory write transaction upstream to the upstream device. The upstream device recognizes the special memory address of the memory write transaction and thereby understands that the downstream device wants to trim the upstream facing link from 16 lanes to 4 lanes. The downstream device then proceeds to the standard-defined L0s state, where all of its upstream facing transmitters shut off and go to electrical idle. The upstream device's receivers detect electrical idle, and the upstream device proceeds to prepare itself to receive traffic on 4 lanes only. The downstream device then exits from the L0s low power state and the downstream device only re-enables 4 of the lanes and sends traffic on these 4 lanes only.

As one example, suppose that a traffic pattern for GPU 310 is to issue read requests upstream and chipset 315 returns data completions downstream that are four times the size of a read request. In this exemplary traffic pattern if a conventional PCIe bus implementation was used, a link width and speed that would saturate the downstream sub-link with completions would result in the upstream link being occupied only 25% of the time, which wastes power. In contrast, the present invention permits the bandwidth of upstream and downstream links to be separately selected. This permits, for example, the upstream and downstream links to have a bandwidth selected to minimize power consumption consistent with keeping the upstream and downstream links nearly saturated, i.e., with comparatively little idle time.

Figure 6:
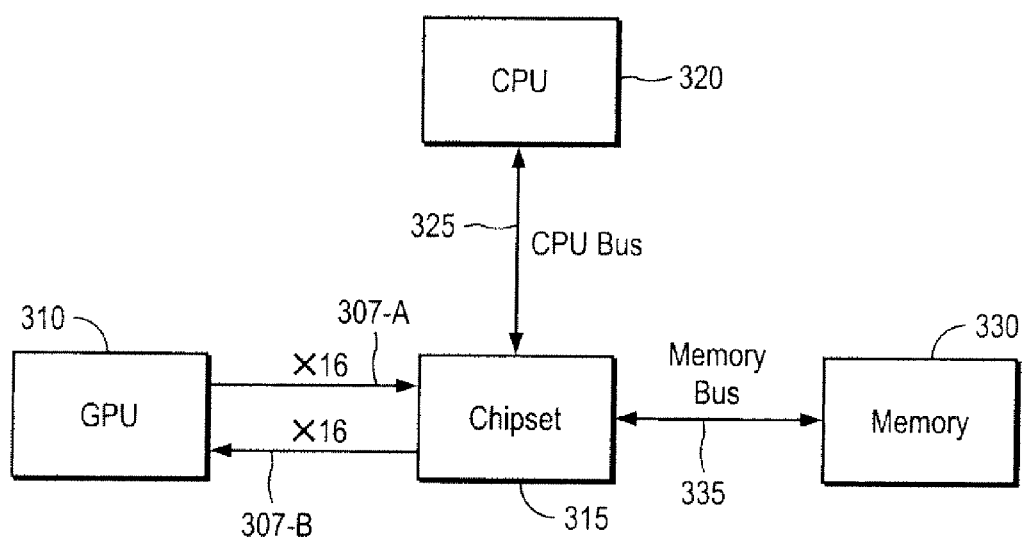
FIG. 6 is a block diagram illustrating a graphics system in a symmetric bus mode in accordance with one embodiment of the present invention.
Figure 7:
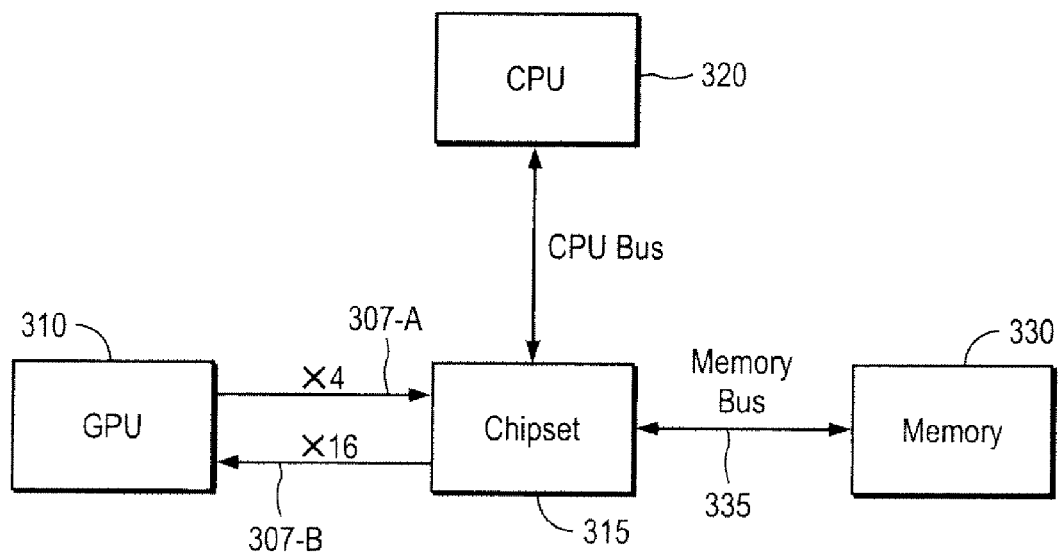
FIG. 7 is a block diagram illustrating a graphics system with an asymmetric bus mode in accordance with one embodiment of the present invention.
Figure 8:
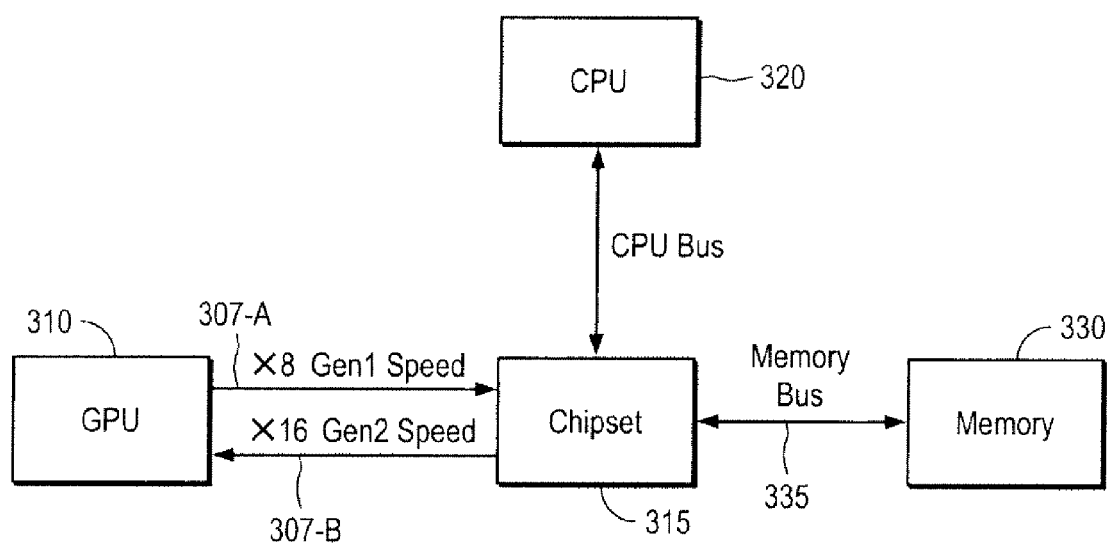
FIG. 8 is a block diagram illustrating a graphics system with an asymmetric bus mode in accordance with one embodiment of the present invention.

FIGS. 6, 7, and 8 illustrate some exemplary bus configurations for a bus capable of supporting sixteen serial data lanes. Referring to FIG. 6, in a normal mode each sub-link 307-A and 307-B is a ×16 sub-link having the same speed. That, is the upstream and downstream bandwidth are equal because the bidirectional link aggregates an equal number of, simplex connections in each direction, with each simplex connection also having the same speed, as in conventional PCIe. FIG. 7 illustrates a configuration in which the upstream sub-link 307-A is a ×4 sub-link (i.e., four simplex connections aggregated into one sub-link) whereas the downstream sub-link 307-B is a ×16 sub-link (i.e., 16 simplex connections aggregation into one sub-link). Thus, comparing FIGS. 6 and 7, it can be seen that the configuration of FIG. 7 has the same downstream bandwidth but has twelve fewer active simplex connections, resulting in a significant power savings. FIG. 8 illustrates an example in which the upstream sub-link 307-A is a ×8 Gen1 speed sub-link whereas the downstream sub-link 307-B is a ×16 Gent speed sub-link.

While the present invention has been described in regards to a PCIe embodiment, it will be understood that more generally the present invention may be applied to other buses having a plurality of data lanes.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A bus interface, comprising:
a plurality of receivers to establish simplex connections with corresponding transmitters of another bus interface;
a plurality of transmitters to establish simplex connections with corresponding receivers of said another bus interface;
a link control module to negotiate a bidirectional link with said another bus interface in which a selected set of said receivers are configured into a first uni-directional sub-link in a downstream direction and a selected set of said transmitters are configured into a second uni-directional sub-link in an upstream direction, where the number of active simplex connections in each of said first uni-directional sub-link and said second un-directional sub-link are independently selectable;
the bus interface having a symmetric mode in which the upstream bandwidth and downstream bandwidth are equal and an asymmetric mode in which the upstream bandwidth and downstream bandwidth are selected to be asymmetric in order to reduce bus power consumption when bus traffic patterns are asymmetric.

2. The bus interface of claim 1, wherein an asymmetry controller regulates the upstream bandwidth and the downstream bandwidth in response to a control signal.

3. The bus interface of claim 2, wherein said asymmetry controller further selects a speed setting of each unidirectional sub-link to control upstream bandwidth and downstream bandwidth.

4. The bus interface of claim 1, wherein said link control module includes a transmitter link training and status state machine and a receiver link training and status state machine such that the unidirectional sub-link in the downstream direction and the unidirectional sub-link in the upstream direction are trained and configured by separate state machines.

5. The bus interface of claim 1, wherein said symmetric mode is compliant with the Peripheral Component Interface Express standard.

6. The bus interface of claim 1, wherein said symmetric mode is a default mode and said asymmetric mode is a low power mode.

7. The bus interface of claim 1, wherein said asymmetry controller receives a first control signal indicative of upstream and downstream traffic and a second control signal indicative of a power mode, wherein said asymmetry controller selects upstream and downstream bandwidth based on traffic patterns and power saving requirements.

8. An integrated circuit, comprising:
at least one functional block requiring access to a bus;
a traffic engine monitoring said at least one functional block and generating a traffic signal indicative of upstream and downstream bus traffic;
a bus interface including:
a plurality of receivers to establish simplex connections with corresponding transmitters of another bus interface;
a plurality of transmitters to establish simplex connections with corresponding receivers of said another bus interface;
a link control module to negotiate a bidirectional link with said another bus interface in which a selected set of said receivers are configured into a first uni-directional sub-link in a downstream direction and a selected set of said transmitters are configured into a second uni-directional sub-link in an upstream direction, where the number of active simplex connections in each of said first uni-directional sub-link and said second un-directional sub-link are independently selectable;
the bus interface having a symmetric mode in which the upstream bandwidth and downstream bandwidth are equal and an asymmetric mode in which the upstream bandwidth and downstream bandwidth are selected to be asymmetric in order to reduce bus power consumption when bus traffic patterns are asymmetric.

9. The integrated circuit of claim 8, wherein said asymmetry controller further selects a speed setting of each unidirectional sub-link to control upstream bandwidth and downstream bandwidth.

10. The integrated circuit of claim 8, wherein said link control module includes a transmitter link training and status state machine and a receiver link training and status state machine such that the unidirectional sub-link in the downstream direction and the unidirectional sub-link in the upstream direction are trained and configured by separate state machines.

11. The integrated circuit of claim 8, wherein said symmetric mode is compliant with the Peripheral Component Interface Express standard.

12. The integrated circuit of claim 8, wherein said symmetric mode is a default mode and said asymmetric mode is a low power mode.

13. The integrated circuit of claim 8, further comprising an asymmetry controller wherein the asymmetry controller receives a first control signal indicative of upstream and downstream traffic and a second control signal indicative of a power mode, wherein said asymmetry controller selects upstream and downstream bandwidth based on traffic patterns and power saving requirements.

14. A graphics system, comprising:
- a chipset, said chipset including a first bus interface having a set of receivers, a set of transmitters, and a first link control module; and
- a graphics processing unit, comprising:
    - at least one functional block in said graphics processing unit requiring access to a bus to said chipset;
    - a traffic engine in said graphics processing unit monitoring said at least one functional block and generating a traffic signal indicative of upstream and downstream bus traffic;
    - a second bus interface disposed in said graphics processing unit to establish a bidirectional link with said chipset, said second bus interface comprising:
        - a plurality of receivers to establish simplex connections with corresponding transmitters of another bus interface;
        - a plurality of transmitters to establish simplex connections with corresponding receivers of said another bus interface;
        - a link control module to negotiate a bidirectional link with said another bus interface in which a selected set of said receivers are configured into a uni-directional sub-link in a downstream direction and a selected set of said transmitters are configured into a uni-directional sub-link in an upstream direction;
    - the bus interface having a symmetric mode in which the upstream bandwidth and downstream bandwidth are equal and an asymmetric mode in which the upstream bandwidth and downstream bandwidth are selected to be asymmetric in order to reduce bus power consumption when bus traffic patterns are asymmetric.

15. The graphics system of claim 14, wherein said asymmetry controller further selects a speed setting of each unidirectional sub-link to control upstream bandwidth and downstream bandwidth.

16. The graphics system of claim 14, wherein said link control module includes a transmitter link training and status state machine and a receiver link training and status state machine such that the unidirectional sub-link in the downstream direction and the unidirectional sub-link in the upstream direction are trained and configured by separate state machines.

17. The graphics system of claim 14, wherein said symmetric mode is compliant with the Peripheral Component Interface Express standard.

18. The graphics system of claim 14, further comprising an asymmetry controller, wherein the asymmetry controller regulates the upstream bandwidth and the downstream bandwidth in response to a control signal.

* * * * *